United States Patent [19]

Klingler

[11] 3,855,221
[45] Dec. 17, 1974

[54] HYDROXYPHENYL HYDROXYETHYLAMINOALKYL THEOPHYLLINES

[75] Inventor: Karl-Heinz Klingler, Langen, Germany

[73] Assignee: Deutsche Gold- und Silber-Schiedeanstalt Vormals Roessler, Frankfurt, Germany

[22] Filed: Aug. 30, 1972

[21] Appl. No.: 284,911

[30] Foreign Application Priority Data
Sept. 6, 1971 Austria .............................. 7745/71

[52] U.S. Cl. ................ 260/256, 260/253, 424/253
[51] Int. Cl. ........................................... C07d 51/48
[58] Field of Search ........................... 260/253, 256

[56] References Cited
UNITED STATES PATENTS
3,245,994  5/1966  Klinger et al. ...................... 260/256
FOREIGN PATENTS OR APPLICATIONS
675,042  1/1966  Belgium .............................. 260/253

*Primary Examiner*—Donald G. Daus
*Assistant Examiner*—Anne Marie T. Tighe
*Attorney, Agent, or Firm*—Cushman, Darby & Cushman

[57] ABSTRACT

Compounds are prepared having the formula:

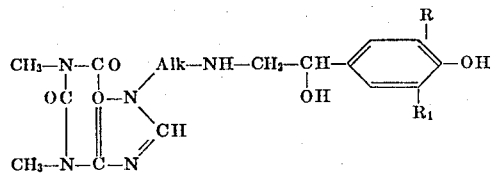

where R is methyl or hydroxymethyl, $R_1$ is hydrogen or methyl, Alk is a propylene group which is unsubstituted or substituted by an alkyl group with 1 to 3 carbon atoms or a pharmacologically acceptable salt thereof. The compounds have good bronchospasmolytic activity.

14 Claims, No Drawings

HYDROXYPHENYL HYDROXYETHYLAMINOALKYL THEOPHYLLINES

The present invention relates to novel basic substituted alkyltheophyllines.

In Belgian Pat. No. 675,042 there are described compounds of Formula A,

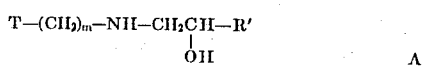

where T is the theophyllinyl-(7)-group, R' is hydroxyaryl, specifically hydroxypenyl and $m$ is 2 or 3. The compound where $m$ is 3 has a much stronger broncholytic action than the compound where $m$ is 2. In the known compounds of the Belgian patent the broncholytic activity is coupled very strongly with disturbing side reactions, especially a very dangerous tachycardia. These side reactions are frequently noticed even prior to the commencement of the desired broncholytic activity.

In my copending U.S. application Pat. No. 163,468, filed July 16, 1971 now U.S. Pat. No. 3,728,346 there are disclosed novel theophylline derivatives of formula B,

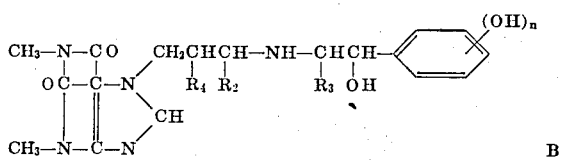

where $R_4$ and $R_2$ are alkyl or 1 to 4 carbon atoms, $R_3$ is hydrogen or alkyl of 1 to 4 carbon atoms and $n$ is 1 or 2 as well as the non toxic pharmacologically acceptable salts thereof. The theophylline derivative of formula B have an outstandingly strong broncholytic activity while the side effects, especially tachycardia, are either not present or are sharply reduced in the range of effective dosage. The entire disclosure of said Klingler U.S. application Pat. No. 163,468 is hereby incorporated by reference.

The present invention is directed to compounds of general formula I,

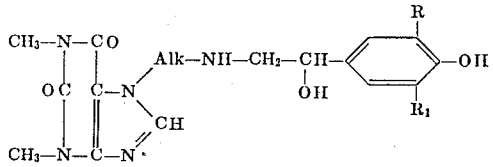

where R is methyl or hydroxymethyl, $R_1$ is hydrogen or methyl, Alk is a propylene group which is either unsubstituted or is substituted by an alkyl group with 1 to 3 carbon atoms and their acid addition salts, particularly the non toxic pharmacologically acceptable salts.

The propylene group can be substituted for example in the 1, 2 or 3 position. There can also be several alkyl groups present simultaneously on the same or different carbon atoms of the propylene group. As lower alkyl groups above all there are employed those with 1 – 2 carbon atoms, especially with one carbon atom. Generally, the propylene group is either unsubstituted or contains one or two alkyl groups.

The new compounds possess valuable bronchospasmolytic activity. The long duration of the activity as well as the slight side effects are conspicuous.

The side reactions, especially tachycardia, either in general are not present in the range of effective dosage or are present only in such a slight amount that no impairment and disturbance of the healing activity occur.

As salts of the amines of Formula I there can be prepared and employed salts of any non toxic pharamaceutically acceptable acid such as hydrochloric acid, hydrobromic acid, sulfuric acid, p-toluene sulfonic acid, acetic acid, propionic acid, succinic acid, maleic acid, malonic acid, fumaric acid, lactic acid, tartaric acid, and citric acid.

Examples of compounds within the present invention in addition to those mentioned in the specific examples include 7-{3-[2-(3-hydroxymethyl-4-hydroxy-5-methyl)-2-hydroxyethylamino]-butyl} -theophylline (and its salts, e.g., hydrochloride and acetate salts); 7-{3-[2-(3-methyl-4-hydroxyphenyl)-2-hydroxyethylamino]-propyl}-theophylline; 7-{3-[2-(3-hydroxymethyl-4-hydroxyphenyl)-2-hydroxyethylamino]-butyl} -theophylline; 7-{3-[2-(3-methyl-4-hydroxyphenyl)-2-hydroxyethylamino]-2-methylbutyl}-theophylline; 7-{3-[2-(3-hydroxymethyl-4-hydroxyphenyl)-2-hydroxyethylamino]-2-methylbutyl} -theophylline; 7-{3-[2-(3-methyl-4-hydroxyphenyl)-2-hydroxyethylamino]-1-methylpropyl} -theophylline; 7-{3-[2-(3-hydroxymethyl-4-hydroxyphenyl)-2-hydroxyethylamino]-1-methylpropyl} -theophylline; 7-{3-[2-(3-hydroxymethyl-4-hydroxyphenyl)-2-hydroxyethylamino]-2-methylpropyl} -theophylline; 7-{3-[2-(3-methyl-4-hydroxyphenyl)-2-hyroxyethylamino]-2-methylpropyl} -theophylline; 7-{3-[2-(3-methyl-4-hydroxyphenyl)-2-hydroxyethylamino]-pentyl -} theophylline; 7-{3-[2-(3-hydroxymethyl-4-hydroxyphenyl)-2-hydroxyethylamino]-pentyl}theophylline; 7-{3-[2-(3-methyl-4-hydroxy-phenyl)-2-hydroxyethylamino]-2-ethylpropyl}theophylline.

The compounds of the invention can be prepared in various ways which in themselves are well known, e.g., the four procedures set forth below:

a. By reducing the keto group of compounds of the formula

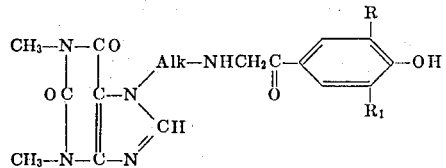

or their salts to the hydroxyl group. This procedue is shown in the working examples and is also illustrated in several of the examples of the aforementioned Klingler U.S. application Pat. No. 163,468. The starting materials for process (a) can be prepared, for example, in a manner analogous to the process described in Belgian Pat. No. 675,042, the entire disclosure of which is hereby incorporated by reference. Examples 1–3 of the present case also show the preparation of the starting materials for process (a).

b. By reacting a compound of the general formula

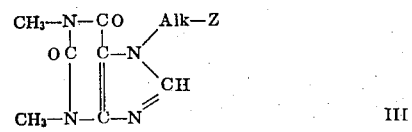

with a compound of the general formula

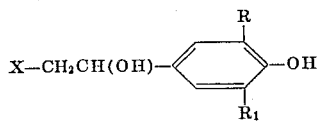

$$\text{IV}$$

wherein one of X and Z is a halogen and the other is an amino group. This procedure is illustrated in Klingler U.S. application Pat. No. 163,468, example 6.

c. By condensing with hydrogenation a compound of the general formula

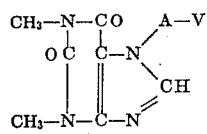

$$\text{V}$$

with a compound of the general formula

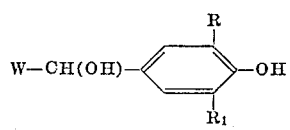

$$\text{VI}$$

where A is ethylene or a lower alkyl substituted ethylene, V is either the group —C(R$_5$)=O or —C(R$_5$)—NH$_2$ where R$_5$ is hydrogen or lower alkyl and W is —CH$_2$NH$_2$ when V is —C(R$_5$)=O and W is a —CHO group when V is —C(R$_5$)NH$_2$. This procedure is illustrated in Klingler U.S. application Pat. No. 163,468, examples 7 and 8.

d. By reacting a compound of general formula III where Z is an amino group with a compound of the general formula

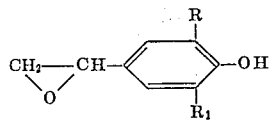

$$\text{VII}$$

In any of procedures (a), (b), (c) or (d) the free base can be converted into its addition salt.

In the above recited processes it is frequently expedient to protect the phenolic hydroxyl groups as well as the secondary or primary amino groups by a known protective group. Frequently such protective groups are already required for the starting compounds. These protective groups are easily splittable from the end products. It is either a matter of easily solvolytic splittable acyl groups or hydrogenating splittable groups as for example the benzyl group. The solvolytic splittalbe protective groups are split off for example by saponification with dilute acids at room temperature or by a short boiling. According to the type of protective group, however, the splitting also takes place during the reaction process. For example, the latter is the case in process (a) if the secondary amino group as well as, in a given case, the phenolic hydroxyl group also are protected by a benzyl group or a carbobenzoxy group. If the protective group is not split off during the reaction a simple after treatment of the reaction product is necessary wherein then the splitting off of the protective groups takes place, for example under the conditions given above.

As protective groups for the secondary amino groups [process (a)] as well as for the primary amino groups [processes (b), (c) and (d)]; there can be used, for example: the benzyl group, α-phenylethyl group, benzyl groups substituted in the benzene nucleus such as, for example, the p-bromo or p-nitrobenzyl group, the carbobenzoxy group, the carbobenzthio group, the trifluoroacetyl group, the phthalyl group, the trityl group, the p-toluenesulfonyl group and similar groups. These same protective groups can be used for the phenolic hydroxyl groups; additionally there can be used simple acyl groups as, for example, the acetyl group.

In process (a) in general there is already present this type of protective group from the production of the starting material. This protective group (benzyl group) is then in the hydrogenation hydrogenated off simultaneously with the reduction of the keto groups. If the reduction is carried out in another manner, in a given case a hydrogenation with hydrogen is joined thereto.

The reduction of the keto group according to process (a) is generally carried out by catalytic hydrogenation. As catalysts there can be used, for example, the customary finely divided metal catalysts such as noble metal catalysts, for example platinum or especially palladium. The process can be carried out at normal or elevated temperatures. A temperature range of about 40° to 100° C. is suitable.

The reaction is normally carried out in a solvent such as a lower aliphatic alcohol, e.g., methanol, ethanol, propanol, butanol or isopropanol, alcohol-water mixtures, dimethyl formamide, etc. There can be employed the free bases of formula II or the salts. If the phenolic hydroxyl groups as well as the secondary amino groups contain benzyl protective groups then these are split off simultaneously in the catalytic hydrogenation if, for example, a palladium catalyst is used. The reduction of the keto group can also take place through nascent hydrogen (alkali alcoholates, e.g., sodium methylate, sodium ethylate and potassium ethylate, alkaline earth alcoholates, e.g., calcium ethylate, sodium amalgam, aluminum amalgam) or metal hydrides, for example, complex metal hydrides such as lithium aluminum hydride or sodium borohydride, or aluminum alcoholates (e.g., aluminum isopropylate-isopropanol).

If R is the hydroxymethyl group under mild conditions there is obtained the end proudct of formula I where R is —CH$_2$OH and by stronger conditions the end product where R is CH$_3$. If it is desired to maintain the CH$_2$OH group it is suitable to work at low or only slightly elevated temperatures as well as at normal pressure and to add the compound of formula II as the base. Another possibility is to reduce the ketone of formula II with a reducing agent which only attacks keto groups, especially complex metal hydrides such as sodium borohydride or lithium aluminum hydride and in a given case to subsequently split off the protective group by catalytic hydrogenation under mild conditions.

To recover the end product of formula I in which R is CH$_3$ in the case that R is CH$_2$OH in the starting material of formula II hydrogenation is carried out until the amount of hydrogen calculated for the reduction of the keto group and the hydroxymethyl as well as in a given case for the splitting off of the protective group is taken up (pH in the acid region and elevated pressure are favorable for this).

To obtain the starting materials of formula II for process (a) there can be reacted, for example, an amine of general fomula V with a halogenated ketone of general formula VI in a solvent such as a lower alcohol, e.g., methanol, ethanol, propanol, isopropanol or butanol or an aromatic hydrocarbon, e.g., benzene, toluene or xylene at a temperature above 50° C. wherein the hydroxyl group on the benzene nucleus of VI can be protected by a protective group,

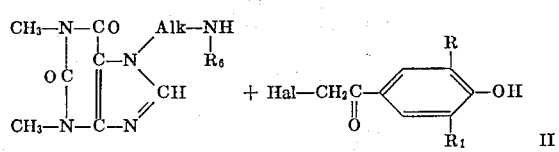

where $R_6$ is a protective group for an amino group of the type set forth above, e.g., benzyl, α-phenylethyl, p-bromobenzyl, p-nitrobenzyl, carbobenzoxy, carbobenzthio, trifluoroacetyl, phthalyl, trityl or p-toluenesulfonyl and Hal is chlorine, bromine or iodine.

Frequently it is not necessary in process (a) to isolate compound II but it can instead be reduced in a one step process.

Processes (b) and (d) are carried out suitably in a solvent such as benzene, toluene, xylene, dimethyl formamide, lower aliphatic alcohols, e.g., methanol, ethanol, propanol, isopropanol or butanol or in the melt. There are used elevated temperatures, for example, between 50° and 200°C. In a given case in process (b) an acid acceptor in employed such as alkali carbonates, for example, potassium carbonate and sodium carbonate, excess amine.

In process (c) there can be employed room temperature or elevated temperature. It can be carried out at normal pressure or at elevated pressure. The reaction according to this process is carried out in a solvent such as an alcohol, e.g., methanol, ethanol, propanol, isopropanol or butanol, water-alcohol mixtures, dimethyl formamide or dimethyl formamide containing mixtures. As catalysts there are used the customary hydrogenation catalysts such as platinum, palladium or nickel with or without carriers. If there are present on the nitrogen of the side chain or on the hydroxyl group of the phenyl residue hydrogenolytically splittable protective groups these are simultaneously split off by the use of palladium as the dydrogenation catalyst.

The compounds can be converted into salts in the conventional manner. As anions for the salts there can be used the known, therapeutically useful acid groups. Typical suitable acids for forming the salts have been set forth above.

Those compounds which contain asymmetric carbon atoms and which as a rule are obtained as racemates can be split into optically active acid. However, it is also possible from the outset to employ optically active or disasterometric starting materials whereby there is obtained as the final product a corresponding pure optically active form or a disastereomer configuration. There can also occur stereoisomer racemates since there are present in the compounds produced two or more asymmetrical carbon atoms. Separation is possible in the customary manner, for example by recrystallization.

As stated previously the compounds of the invention are useful in the production of pharmaceutical compositions. The pharmaceutical compositions or medicaments can contain one or more of the compounds of the invention or mixtures of these with other pharmaceutically active materials. For the production of pharmaceutical preparations there can be used the customary pharmaceutical carriers and assistants. The medicines can be used enterally, parenterally, orally or perlingually. Dispensing can take place in the form of tablets, capsules, pills, dragees, plugs, salves, powders, liquids or aerosols. As liquids there can be used oily or aqueous solutions or suspensions, emulsions, injectable aqueous and oily solutions or suspensions.

Unless otherwise indicated all parts and percentages are by weight.

EXAMPLE 1

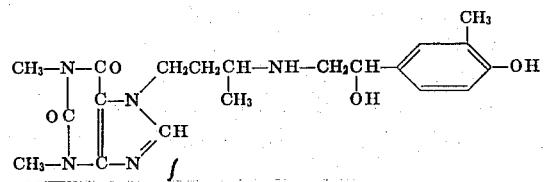

15.0 grams of 7-{3-[2-(3-methyl-4-hydroxyphenyl)-2-oxoethylbenzylamino]-butyl}-theophylline-hydrochloride were suspended in 300 ml of ethanol and 75 ml of distilled water and with the addition of 1.5 grams of palladium on activated carbon (5% Pd) shaken at 65° C. with hydrogen. After the end of the take up of hydrogen the mixture was filtered, the solvent distilled off in a vacuum and the residue recrystalized from ethanol with the addition of a little water, there were obtained 8.3 grams of 7-{3-[2-(3-methyl-4-hydroxyphenyl)-2-hydroxyethyl-amino]-butyl}-theophylline hydrochloride with a melting point of 207° to 208° C.

To produce the starting material there were dissolved 75 grams of 7-(3-benzylamino-butyl)-theopylline in 180 ml of 25 percent ethanol and there were added dropwise into the boiling solution with stirring in the course of 2 hours a solution of 20.4 grams of 4-chloroacetyl-2-methylphenol in 120 ml of ethanol. The mixture was boiled for 3 more hours with reflux, filtered and the solvent distilled off in a vacuum. The residue was dissolved in ethanol and acidified with ethanolic hydrochloric acid. On the next day the product was filtered with suction and recrystallized from water. There were obtained 17.5 grams of 7-{3-[2-methyl-4-hydroxyphenyl)-2-oxoethyl-benzyl-amino]-butyl}-theophylline hydrochloride having a melting point of 176°–179° C.

EXAMPLE 2

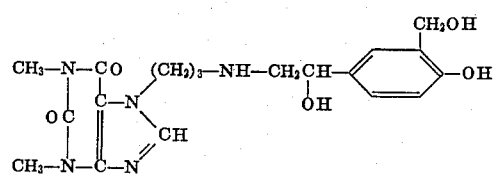

a. 12.0 grams of 7-{3-[2-(3-hydroxymethyl-4-hydroxyphenyl)-2-oxoethyl-benzylamino]-propyl}- theophylline hydrochloride were dissolved in 120 ml of water, the solution treated with an excess of sodium bicarbonate and stirred with ethyl acetate. The ethyl acetate solution was separated, dried over magnesium sulfate and the solvent distilled off.

The oily base was dissolved in 150 ml of ethanol and hydrogenated after the addition of 2 grams of 5 percent palladium-activated carbon catalyst at 60° C. After the taking up of 2 moles of hydrogen the product was filtered, evaporated in a vacuum and the residue recrystallized twice from methanol. There were obtained 2.3 grams of 7-{3-[2-(3-hydroxymethyl-4-hydroxyphenyl)-2-hydroxyethylamino]-propyl}-theophylline melting at 160° to 162° C.

b. 5.28 grams of 7-{3-[2-(3-hydroxymethyl-4-hydroxyphenyl)-2-oxoethyl-benzylamino]-propyl}-theophylline hydrochloride were stirred in 25 ml of ethanol and there was added 0.75 gram of sodium borohydride in 10 ml of 1 normal soda lye at 10° C. The mixture was stirred for another 5 hours at this temperature and finally allowed to stand for 24 hours at about 25° C. Now it was cooled with ice and acidified with dilute sulfuric acid. The alcohol was distilled off in a vacuum, the mixture made alkaline with soda solution and stirred twice, each time with 25 ml of ethyl acetate at 60° C. Both, still hot, separated ethyl acetate extracts were combined and stirred at 50° C. for 3 hours with anhydrous sodium sulfate, filtered and evaporated in a vacuum. The residue was recrystallized from isopropanol. There were obtained 2.3 grams of 7-{3-[2-(3-hydroxymethyl-4-hydroxy-phenyl)-2-hydroxyethyl-benzylamino]-propyl} -theophylline whose melting point was about 145° C.

2.0 grams of this substance were dissolved in 60 ml of 90 percent ethanol and hydrogenated at 60° C. with addition of 0.3 gram of palladium-activated carbon catalyst (5 percent). The product was filtered, evaporated in a vacuum and recrystallized from methanol. There were obtained 0.8 grams of the end product described under example 2a of melting point 150°–160° C.

Production of the Starting Material For Examples 2a and b 366 grams of 7-(3-benzylamino-propyl)-theophylline and 183 grams of 3-acetoxymethyl-4-acetoxy-omega-bromo-acetophenone were dissolved in 1,800 ml of benzene and the reaction mixture boiled at reflux for 18 hours with stirring. The mixture was filtered with suction, the solvent distilled off in a vacuum, the product dissolved in eithyl acetate and acidified with alcoholic hydrochloric acid. The separated oily precipitate was stirred with fresh ethyl acetate and filtered off with suction after several days.

To deacetylate the crude product thus obtained it was treated with 740 ml of 10 percent hydrochloric acid. The mixture was stirred until it all went into solution and allowed to stand for a further 60 hours. Subsequently it was filtered off with suction, washed with water and ethanol, recrystallized from methanol and finally from ethanol. There were obtained 50.5 grams of the starting material necessary for Examples 2a and 2b, melting point 200° to 202° C.

EXAMPLE 3

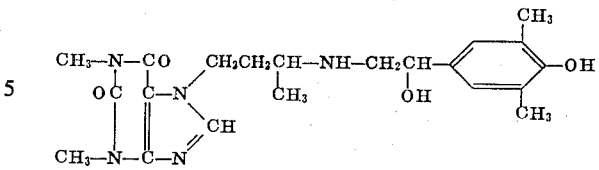

37.8 grams of 7-{3-[2-(3,5-dimethyl-4-hydroxyphenyl)-2-oxoethyl-benzylamino]-butyl}-theophylline hydrochloride were dissolved in 750 ml of distilled water and 375 ml of ethanol. There were added 7 grams of a 5 percent palladium-activated carbon catalyst and the mixture hydrogenated at 65° C. After filtration the mixture was evaporated and the evaporation residue crystallized by stirring with acetone. For further purification the material removed with suction dried by refluxing with alcohol, again removed with suction and dried. There were obtained 23.8 grams of 7-{3-[2-(3,5-dimethyl-4-hydroxyphenyl)-2-hydroxyethylamino]-butyl}-theophylline hydrochloride having a melting point of 223°–224° C.

Production of Stating Material

There were added dropwise into a boiling solution of 102 grams of 7-(3-benzylamino-butyl)-theophylline in 300 ml of 25 percent ethanol a solution of 29.9 grams of 3,5-dimethyl-4-hydroxy-phenacyl chloride (3,5-dimethyl-4-hydroxy-omega chloroacetophenone) in 150 ml of ethanol within 2 hours. The mixture was boiled a further 5 hours at reflux, cooled, acidified with alcoholic hydrochloric acid, 80 ml of water added and then allowed to stand for 2 days in the refrigerator. The product which crystallized out was filtered off with suction, washed with alcohol and dried. There were obtained 53 grams of 7-{3-[3,5-dimethyl-4-hydroxyphenyl)-2-oxoethylbenzylamino]-butyl}-theophylline hydrochloride having a melting point of 180° to 184° C. The product was purified by recrystallizing from ethanol. The melting point then was 185°–188° C. The 3,5-dimethyl-4-hydroxyphenacyl chloride required for the production of the starting material was prepared according to the *Journ. Med. Chem.* Vol. 9, pages 211–213 (1966). According to this procedure there was reacted 2,6-dimethylphenol with chloroacetyl chloride in the presence of $AlCl_3$.

The compounds of the invention are suited for the production of pharmaceutical compositions and preparations. The pharmaceutical compositions or drugs contain as the active material one or several of the compounds of the invention, in a given case in admixture with other pharmacologically or pharmaceutically effective materials. The production of the medicine can take place with the use of known and customary pharmaceutical carriers and diluents, as well as other customary assistants.

Such carriers and assistants are set forth for example in *Ullmann's Encyklopadie der technischen Chemie*, Vol. 4 (1953), pages 1 to 39; *Journal of Pharmaceutical Sciences*, Vol. 52 (1963), pages 918 et seq; Hiv. CzetschLindenwald, *Hilfstoffe fur Pharmazie und angrenzende Gebiete;* as well as in Pharm. I Vol. 2 (1961) pages 72 et seq.

Examples of such materials include gelatin, sucrose, pectin, starch, tylose, talc, lycopodium, solica, lactose, cellulose derivatives, micropulverized cellulose, stearates, e.g., methylstearate and glyceryl stearate, emulsifiers, vegetable oils, water, pharmaceutically compatible mono- or polyvalent alcohols and polyglycols such as glycerine, mannitol, sorbitol, pentaerythritol, ethyl alcohol, diethylene glycol, triethylene glycol, ehtylene glycol, propylene glycol, dipropylene glycol, polyethylene glycol 400, as well as derivatives of such alcohols and polyglycols, dimethyl sulfoxide, esters of saturated and unsaturated fatty acids with monoor polyvalent alcohols such as glycols, glycerine, diethylene glycol, perthaerythritol, sorbitol, mannitol, etc., e.g., glyceryl stearate, glyceryl palmitate, glyceryl oleate, ethylene glycol stearate; such esters of polyvalent alcohols can in a given case also be etherified, benzyl benzoate, dioxolane, glycerine formal, glycol furfural, dimethyl acetamide, lactamide, lactates, e.g., ethyl lactate, ethyl carbonate, etc.

Furthermore, there can be added preservatives, stabilizers, buffers, taste correctives, antioxidants and complex formers (for example ethylenediaminotetraacetic acid) and the like.

As antioxidants there can be used for example sodium meta bisulfite and ascorbic acid, as preservatives there can be used for example sorbic acid, p-hydroxybenzoic acid esters, e.g., methyl p-hydroxybenzoate and ethyl p-hydroxybenzoate and similar materials.

The pharmacological and galenical treatment of the compounds of the invention takes place according to the usual standard methods.

The drugs can be used enterally, parenterally, orally, perlingually or in the form of sprays.

The addition of other medicinally active materials is also possible especially the addition of analgesically and antiphlogistically effective substances.

The compounds of the invention have a good bronchospasmolytic activity as exhibited, for example, on the isolated tracheal spiral of the guinea pig.

The bronchospasmolytic activity is comparable to that of the known drug orciprenaline.

The middle of the bronchospasm at 50–100 percent expectorant dosage in the above animal experiments expressed as ED50, for example, at $10^{-7}$ to $10^{116\ 9}$ gram/ml.

The compounds of the invention have utility in treating bronchial asthma, chronic asthmatic bronchitis, emphysema bronchitis with spasmic components and additional respiratory illnesses.

The compounds can be delivered in the form of tablets, capsules, liquids or aerosols. As liquids there can be used oily or aqueous solutions or suspensions, emulsions, injectable aqueous or oily solutions or suspensions. The preferred forms of use are tablets which contain between 1 and 50 mg. of active material or solutions which contain between 0.1 and 5 percent of active material.

In individual doses the amount of active component of the invention can be used for example in an amount of 2 mg dispensed orally or 10 strokes of a 0.2 percent solution dispensed as an aerosol. These doses can be dispensed once or several times a day.

For example there is recommended the use of 1 tablet containing 2 mg of active ingredient 3 times daily or dispensed as an aerosol 1 to 4 times a day up to 10 strokes of the 0.2 percent solution.

The acute toxicity of the compounds of the invention in the mouse (expressed by the LD 50 mg/kg method of Miller and Tainer, *Proc. Soc. Exph. Biol. and Med.*, Vol. 57 (1944) pages 261 et seq.) in i.v. application is between 80 mg/kg and 150 mg/kg.

The drugs can be used in human medicine or in veterinary medicine, e.g., to treat cats, dogs, horses, sheep, cattle, goats and pigs.

What is claimed is:

1. A compound having the formula

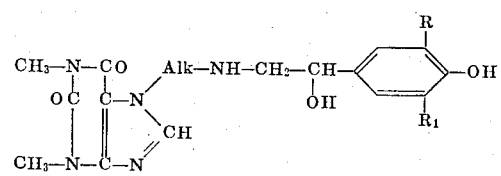

where R is methyl or hydroxymethyl, $R_1$ is hydrogen or methyl, Alk is a group having the formula

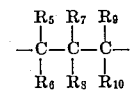

where $R_5$, $R_6$, $R_7$, $R_8$, $R_9$ and $R_{10}$ are hydrogen or alkyl groups with one to three carbon atoms or a pharmacologically acceptable salt thereof.

2. A compound according to claim 1, wherein not over one of $R_5$, $R_6$, $R_7$, $R_8$, $R_9$ and $R_{10}$ is alkyl.

3. A compound according to claim 2, wherein any alkyl group present is methyl.

4. A compound according to claim 3 wherein R is hyroxymethyl.

5. A compound according to claim 4, wherein $R_1$ is hydrogen.

6. A compound according to claim 5, wherein $R_5$, $R_6$, $R_7$, $R_8$, $R_9$ and $R_{10}$ are all hydrogen.

7. A compound according to claim 5, wherein $R_5$, $R_6$, $R_7$, $R_8$ and $R_9$ are hydrogen and $R_{10}$ is methyl.

8. A compound according to claim 3, wherein R is methyl.

9. A compound according to claim 8, wherein $R_1$ is hydrogen.

10. A compound according to claim 9, wherein $R_5$, $R_6$, $R_7$, $R_8$, $R_9$ and $R_{10}$ are hydrogen.

11. A compound according to claim 9, wherein $R_5$, $R_6$, $R_7$, $R_8$ and $R_9$ are hydrogen and $R_{10}$ is methyl.

12. A compound according to claim 8, wherein $R_1$ is methyl.

13. A compound according to claim 12 wherein $R_5$, $R_6$, $R_7$, $R_8$, $R_9$ and $R_{10}$ are all hydrogen.

14. A compound according to claim 12, wherein $R_5$, $R_6$, $R_7$, $R_8$ and $R_9$ are hydrogen and $R_{10}$ is methyl.

* * * * *